US007938383B2

(12) United States Patent
Zur et al.

(10) Patent No.: US 7,938,383 B2
(45) Date of Patent: May 10, 2011

(54) SOLENOID MOUNTING ARRANGEMENT FOR LIQUID DISPENSING VALVE

(75) Inventors: Jeffrey O. Zur, Janesville, WI (US); Brian T. Cahill, Oak Creek, WI (US)

(73) Assignee: Deltrol Controls, Milwaukee, WI (US)

( * ) Notice: Subject to any disclaimer, the term of this patent is extended or adjusted under 35 U.S.C. 154(b) by 751 days.

(21) Appl. No.: 11/835,627

(22) Filed: Aug. 8, 2007

(65) Prior Publication Data

US 2009/0038690 A1 Feb. 12, 2009

(51) Int. Cl.
*F16K 31/02* (2006.01)

(52) U.S. Cl. .................. 251/129.15; 251/291; 251/297; 285/402; 285/403

(58) Field of Classification Search ............. 251/129.15, 251/291, 297; 285/4, 402, 403, 401, 396
See application file for complete search history.

(56) References Cited

U.S. PATENT DOCUMENTS 375,547 A * 12/1887 Gibbs .......................... 277/613
559,390 A * 5/1896 Kinyon ......................... 251/149
666,383 A * 1/1901 Hansen, Albert ............. 251/291
2,699,915 A * 1/1955 Goepfrich ..................... 251/121
3,532,109 A * 10/1970 Smith John J ................ 137/296
3,698,747 A * 10/1972 Wing et al. ................... 285/305
4,676,320 A * 6/1987 Capasso .......................... 169/90
4,708,370 A * 11/1987 Todd .............................. 285/12
4,725,029 A * 2/1988 Herve ...................... 248/221.12
5,172,942 A * 12/1992 Dillmann ........................ 285/39
5,975,118 A * 11/1999 Ulicny et al. ................. 137/338
6,144,275 A * 11/2000 Hirata et al. .................. 335/262
6,457,484 B1 * 10/2002 Najmolhoda ............. 137/15.18
6,684,901 B1 2/2004 Cahill et al.
6,772,989 B2 * 8/2004 Enzaki et al. ................ 251/63.5
6,871,804 B2 * 3/2005 Hagihara ...................... 239/600
6,908,123 B2 * 6/2005 Le ................................ 285/402

* cited by examiner

*Primary Examiner* — John Bastianelli
(74) *Attorney, Agent, or Firm* — Andrus, Sceales, Starke & Sawall, LLP

(57) ABSTRACT

A solenoid valve has a valve body with an inlet, an outlet and a valve chamber therebetween. A valve member is selectively engagable with the valve chamber for controlling the flow of fluid from the inlet to the outlet. A solenoid assembly is mounted upon the valve member for moving the valve member to control the flow of fluid from the inlet to the outlet. The solenoid assembly includes a solenoid and a frame for holding the solenoid. The solenoid assembly is connected to the valve body such that the frame is rotatable and slidable away from the valve body to permit access to and slidable removal of the solenoid from the valve member.

17 Claims, 5 Drawing Sheets

FIG. 1
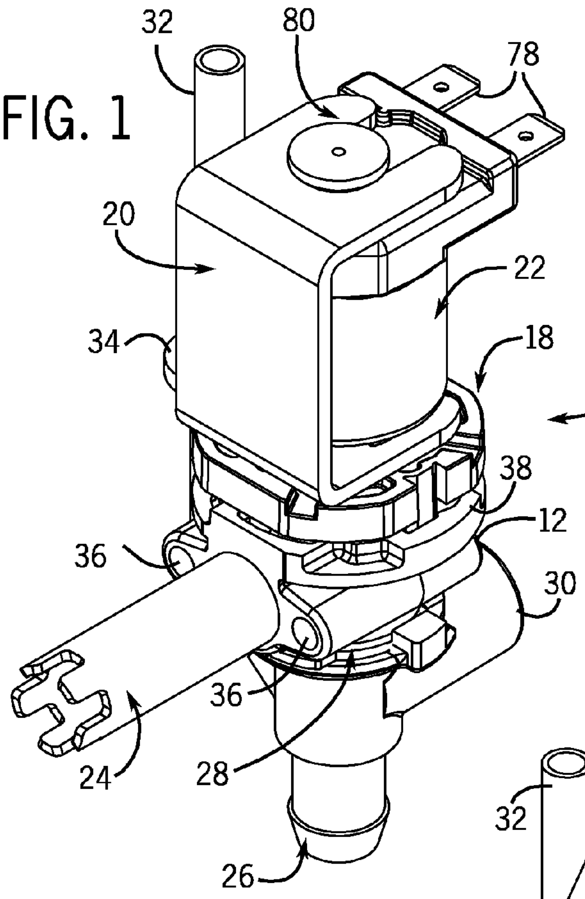
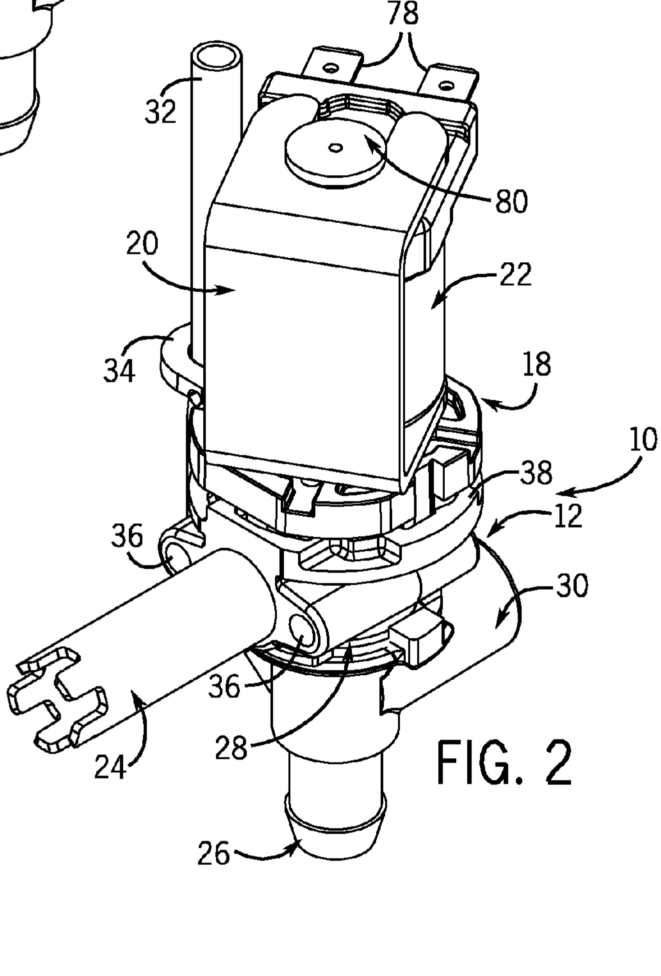
FIG. 2

SOLENOID MOUNTING ARRANGEMENT FOR LIQUID DISPENSING VALVE

FIELD OF THE INVENTION

This invention relates generally to solenoid operated, liquid dispensing valves and, more particularly, pertains to improvements in a solenoid mounting arrangement for such valves.

BACKGROUND OF THE INVENTION

Solenoid valves are commonly used to control the flow of infusion water or liquid in hot beverage machines. The typical solenoid valve of this type includes a valve body that defines a valve chamber, and an inlet and an outlet that communicate with the valve chamber. A valve seat is interposed between the inlet and the outlet, and a solenoid operated valve member is adapted to engage the valve seat to permit and prevent flow to the outlet. In the conventional valve, the valve member is biased to a closed position by a spring, and operation of a solenoid will move the valve to an open position.

U.S. Pat. No. 6,684,901, issued Feb. 3, 2004, and assigned to the assignee of this application, discloses a modular liquid dispensing valve assembled by twisting and untwisting certain valve components into and out of a snap fit without the use of tools and fasteners. In such valve, the solenoid or coil is held in position by a C-shaped frame. A bottom plate of the frame is formed with a plurality of recesses for receiving tang ramping surfaces of locating pins on a snap plate attached to a valve body. The ramping surfaces are snap fit against walls the frame recesses so that the frame, the solenoid and the snap plate form a tightly joined subassembly. This subassembly does not permit an easy disassembly of the frame from the solenoid. Other solenoid mounting arrangements exist which require the use of tools and fasteners to couple and uncouple the frame and the solenoid. Such prior art solenoid mounting arrangements create drawbacks in servicing installed liquid dispensing valves, particularly in the replacement of a solenoid.

It would be desirable to provide a solenoid valve with a solenoid mounting arrangement in which the frame and the solenoid are easily assembled and disassembled on an installed valve body using rotary and sliding motions and a frictional fit. It would also be desirable to provide a solenoid mounting arrangement which does not require tools and fasteners. Likewise, it would be desirable to provide a solenoid valve wherein the frame and the solenoid are cooperatively moved together and adjustably positioned relative to the valve body.

SUMMARY OF THE INVENTION

The present invention relates to a solenoid valve having a valve body with an inlet, an outlet and a valve chamber therebetween. A valve member is selectively engagable with the valve chamber for controlling flow of fluid from the inlet to the outlet. A solenoid assembly is mounted upon the valve member for moving the valve member to control the flow of fluid from the inlet to the outlet. The solenoid assembly includes a solenoid and a frame for holding the solenoid. The solenoid assembly is connected to the valve body such that the frame is rotatable and slidable away from the valve body to permit access to and slidable removal of the solenoid from the valve member.

The frame and the solenoid have cooperating structure preventing rotation of the solenoid relative to the frame. The frame has a bottom end plate, a top end plate and a connector plate joining the bottom end plate and the top end plate. The bottom end plate has a depending nib which is engagable with wall structure on the valve body. The bottom end plate and the top end plate are formed with U-shaped slots defined by a pair of spaced apart bottom arms and a pair of spaced apart top arms. The solenoid has an upper surface formed with stop structure engagable with the top arms of the frame. The solenoid assembly includes a backstop member engagable with the top arms of the frame. The backstop member is biased upwardly against the top arms of the frame by spring structure. The bottom arms of the frame are engagable about an upstanding portion of the valve body that encircles the valve member. The frame is slidable away from the solenoid by pressing downwardly on the backstop member against the force of the spring structure.

In another aspect of the invention, a solenoid operated liquid dispensing valve includes a valve body having an inlet and an outlet for respectively introducing liquid into and delivering liquid out of the valve body. A valve member is selectively movable relative to the valve body for controlling a flow of liquid from the inlet to the outlet. A solenoid assembly is mounted upon the valve body for selectively moving the valve member. The solenoid assembly includes a solenoid slidably mounted on the valve member and a frame for holding the solenoid, wherein the frame is separable from the solenoid without the use of tools and fasteners.

The valve body includes a snap plate having an upper surface formed with a series of spaced apart cavities having walls for positioning the frame. A cylindrical neck rises from the upper surface of the snap plate in the center thereof for receiving a portion of the valve member therethrough, the neck being formed with a number of outwardly projecting retaining elements. The frame has a bottom end plate, a top end plate and a connector plate joining the bottom end plate and the top end plate. The bottom end plate has a depending nib that is engagable with the wall of any of the cavities formed in the snap plate. The bottom end plate of the frame has a pair of spaced apart bottom arms that are frictionally engagable between the upper surface of the snap plate and the retaining elements on the neck. The solenoid assembly includes an upwardly biased tubular backstop member that extends through a center of the solenoid and slidably receives an upper portion of the valve member. A coil spring extends between a top end of the backstop member and the upper portion of the valve member. The top end of the backstop member is formed externally as a spool having a head, a base and a body connecting the head and the base. The top end plate of the frame has a pair of spaced apart top arms that are slidably engagable between the head and the base of the backstop member. The top arms of the frame are engagable against the base of the backstop member.

The frame and the solenoid are rotatable together on the snap plate such that the nib on the frame will travel along the walls of the cavity in the snap plate to a predetermined position whereat downward pressure on the head of the backstop member will enable the frame to be slidably pulled and removed from the snap plate, after which the solenoid may be slidably removed from the valve member.

The invention also contemplates a method of disassembling of solenoid valve to permit servicing thereof. The method includes the steps of (a) providing a valve body having an inlet and an outlet for respectively introducing liquid into and delivering liquid out of the valve body; (b) providing a valve member selectively movable relative to the valve body for controlling flow of liquid from the inlet to the outlet; (c) providing a solenoid assembly movably mounted on the valve body for selectively moving the valve member, the solenoid assembly including a solenoid in a frame for holding the solenoid therein; (d) moving the frame and the solenoid together relative to the valve body to a predetermined position thereon; (e) slidably pulling the frame away from the valve body and the solenoid; and (f) slidably pulling the solenoid upwardly away from the valve member. The steps (d), (e), and (f) are performed without the use of tools and fasteners.

BRIEF DESCRIPTION OF THE DRAWINGS

The drawings illustrate the best mode presently contemplated of carrying out the invention. In the drawings:

FIG. 1 is a top isometric view of a solenoid operated, liquid dispensing valve having a solenoid mounting arrangement shown in an operating position;

FIG. 2 is a view like FIG. 1 showing the solenoid mounting arrangement rotated to a servicing position;

DETAILED DESCRIPTION OF THE INVENTION

Figure 3:
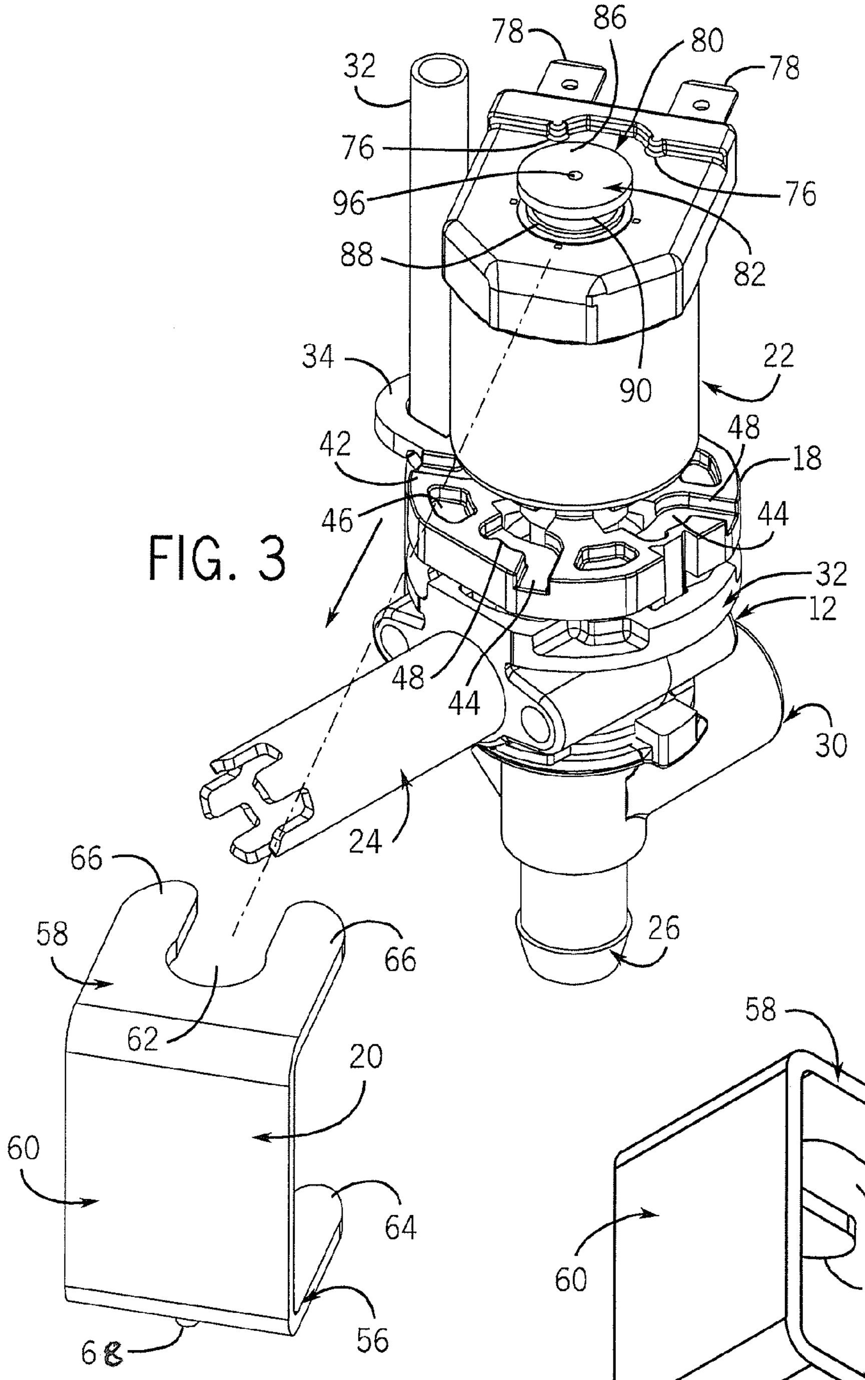
FIG. 3 is a view like FIG. 2 showing removal of the solenoid frame.
Figure 4:
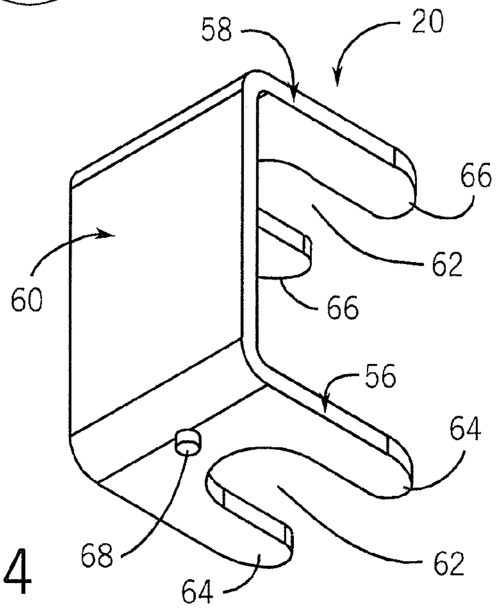
FIG. 4 is a bottom isometric view of the solenoid frame.
Figure 5:
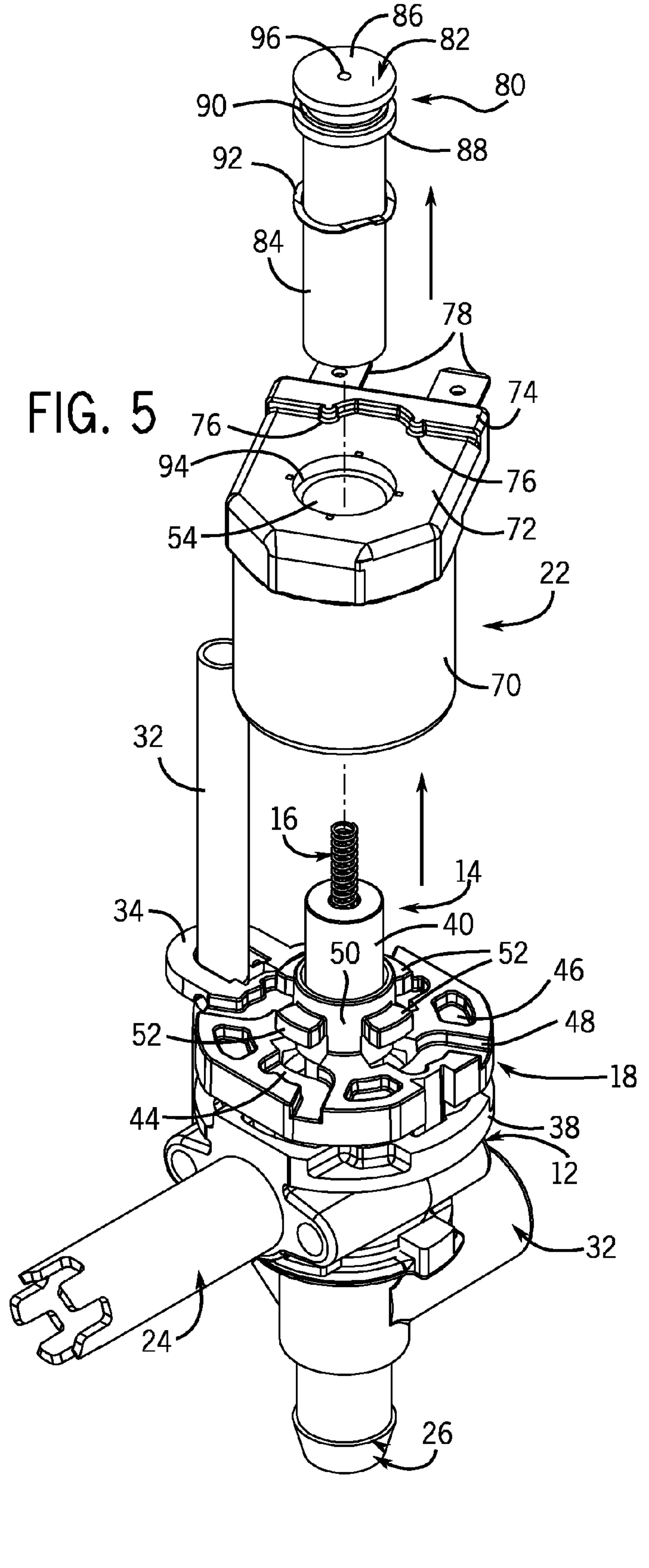
FIG. 5 is a view like FIG. 3 showing the removal of the solenoid.

Referring now to the drawings, there is shown a solenoid operated, liquid dispensing valve 10 embodying the present invention. Valve 10 has particular utility in beverage or liquid dispensing machines, such as for example, coffee machines, soup machines, rug cleaning machines, ice making machines and the like.

Valve 10 is generally comprised of a valve body 12, a valve member 14, a coil spring 16, a snap plate 18, a solenoid frame 20 and a solenoid 22.

Valve body 12 is preferably formed of a plastic or nylon material and includes a horizontally extending inlet 24 and a vertically extending outlet 26 disposed at generally 90 degrees with respect to inlet 24. Valve body 12 also defines a valve chamber 28 which is located between inlet 24 and outlet 26. As is well known, a circular valve seat (not shown) opens into the center of a valve chamber 28. Liquid introduced through the inlet 24, flows through the valve seat and exits through the outlet 26. The outlet 26 is provided with a flow adjuster 30 for altering the flow rate of the outgoing liquid. The outlet 26 is further provided with a vent tube 32 that extends upwardly through a loop 34 on snap plate 18. Valve body 12 includes a tube 36 on either side of the inlet 24 adapted to receive fasteners for mounting the valve 10 as desired. Extending radially outwardly from the valve chamber 28 is a circular crown 38 provided with attachment structure for permitting joinder of the remaining valve components to the valve body 12 as will be detailed below.

The valve member 14 includes an elongated, cylindrical metallic plunger 40 having a lower end which is attached to a flexible diaphragm, and an upper end formed with a blind opening for supporting the lower end of spring 16. The diaphragm is engagable with the valve seat to provide a seal. The plunger 40 and coil spring 16 extend upwardly through the snap plate 18 into the interior of solenoid 22. The plunger 40 is designed to move up and down in response to energization and deenergization of solenoid 22.

Snap plate 18 is disposed on top of crown 38 and includes depending leg and pin structure received with a twisting frictional fit in the engagement structure of the crown 38 as set forth in the aforementioned U.S. Pat. No. 6,684,901. As best seen in FIGS. 5 and 8-10, snap plate 18 has an upper surface 42 molded with a series of four spaced apart dog-legged cavities 44 and a series of various relief cutouts 46. The cavities 44 have walls 48 for enabling positioning of the frame 20 and the solenoid 22 over a limited range of rotary travel thereon. The cavities 44 extend partially through the snap plate 18 and open to a periphery thereof. The upper surface 42 is also formed with an upstanding cylindrical neck 50 throughwhich the plunger 40 extends. The neck 50 is provided with a number of outwardly projecting retaining elements 52 used for retaining the frame 20 in an operating position as shown in FIG. 1. The neck 50 is designed to be received in the bottom of a central passageway 54 formed completely through the solenoid 22.

Frame 20 is generally a C-shaped metal member, and includes a bottom end plate 56 and a top end plate 58 joined by a connector plate 60. Bottom end plate 56 and top end plate 58 are formed with aligned with U-shaped slots 62 defined respectively by a pair of bifurcated bottom arms 64 and a pair of bifurcated top arms 66. A lower surface of the bottom end plate 56 is provided with a depending nib 68 adjacent connector plate 60. As will be understood, the nib 68 is engagable with any one of the walls 48 forming the cavities 44 in snap plate 18 as the frame 20 is rotated and slides thereon.

Solenoid 22 has an encapsulated body 70 for protecting an internal coil (not shown) that surrounds passageway 54. The body 70 has an upper end 72 formed with a ledge 74 provided with a pair of stop elements 76 that are engagable with and project inwardly toward top arms 66 of the frame 20. Suitable terminals 78 for connection of electrical leads project outwardly from the upper end 72 of the solenoid 22. The interior passageway 54 receives a tubular metal backstop member 80 having a spool-like backstop 82 pressed into the top end of a guide tube 84 that extends beyond a bottom end of the body 70. The backstop 82 has a head 86 and a base 88 connected by a body 90 with a smaller diameter than the head and the body. A spring washer 92 encircles the guide tube 84 and is designed to sit between a countersunk surface 94 recessed in the upper end 72 of the solenoid 22 and the bottom of base 88. The head 86 of the backstop 82 is formed with a small aperture 96 to release air from the passageway 54 during plunger movement. The aperture 96 also aids in preventing corrosion of the plunger 40. The top end of the plunger 40 telescopes into a bottom end of the guide tube 84 with the spring 16 engaging the bottom of the backstop 82 so as to provide an upwardly biased force thereon. The body 70 is rotatably supported upon the neck 50 of the snap plate 18 but is normally limited in rotation in an operating mode as will be described below.

As is well known, the force of coil spring 16 will normally urge valve member 14 to a closed position such that the diaphragm seals off the seat in the valve chamber 28 preventing flow from the inlet 24 to the outlet 26. Energization of the solenoid 22, however, will cause the plunger 40 and the diaphragm to be pulled upwardly to an open position so that flow between the inlet 24 and the outlet 26 may occur. With deenergization of the solenoid 22, the coil spring 16 will again force the diaphragm into the closed position.

Figure 7:
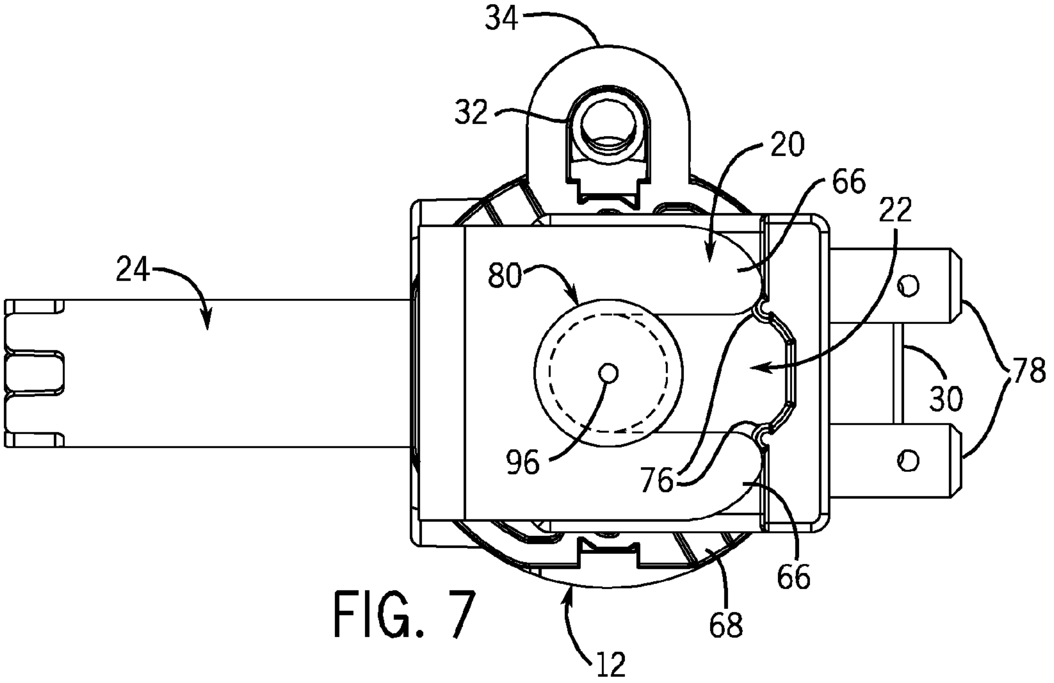
FIG. 7 is a plan view of FIG. 1.

FIGS. 1 and 7 show the valve 10 in a locked, operating position. Here, it is assumed that snap plate 18 has been connected to valve body 12 by a twisting snap fit as set forth in U.S. Pat. No. 6,684,901. It is also assumed that the valve 10 is typically mounted in a dispensing application such as, for example, in a beverage dispenser. With the solenoid 22 slidably mounted on the plunger 40, the bottom arms 64 of frame 20 are frictionally engagable between the upper surface 42 of the snap plate 18 and the bottom of the retaining elements 52 on the neck 50. The nib 68 on the bottom plate 56 is engaged against an end wall 48 of one of the cavities 44. The top arms 66 of frame 20 are slidable between the head 86 and the base 88 of backstop 82 and forced against the base 88. The ends of the top arms 66 are constantly engagable with the stop elements 76 on solenoid 22 to prevent relative rotation between the frame 20 and the solenoid 22. The frame 20 thus frictionally holds the solenoid 22 in place on the valve body 12 during normal valve operation.

The present invention provides a convenient, unique solenoid mounting arrangement which permits at least partial disassembly of the valve 10 and servicing of the solenoid 22 while the valve 10 is installed without the use of tools and fasteners.

Figure 6:
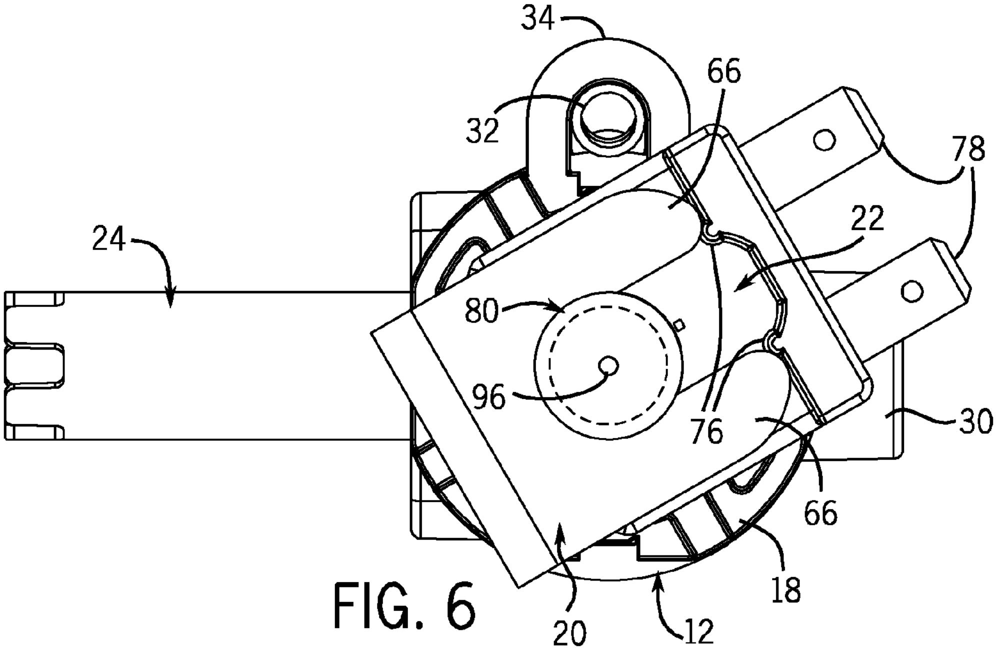
FIG. 6 is a plan view of FIG. 2.

When it is desired to service the solenoid assembly, the snap plate 18 is held and the frame 20 and the solenoid 22 are rotated together to a servicing position shown in FIGS. 2 and 6. Nib 68 has been moved to a wall in a straight portion of cavity 44. At this point, the backstop 82 is pressed downwardly against the biasing force of spring 16 and spring washers 92. This releases the holding force on the frame 20 so that the nib 68 slides out of the cavity 44 at the periphery of snap plate 18, and the frame 20 is slidably removed from the snap plate 18 and the solenoid 22 as shown in FIG. 3. Now, full access to the solenoid 22 is permitted and the solenoid 22 with backstop 82 is lifted upwardly from plunger 40 for inspection and replacement as desired.

Figure 8:
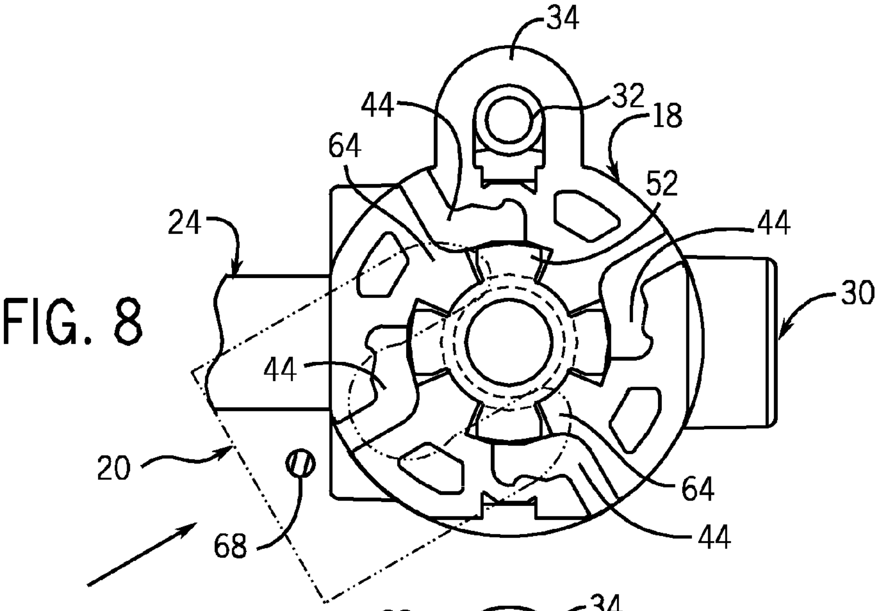
FIGS. 8-10 are sequential partial diagrammatic views showing the replacement of the solenoid frame.
Figure 9:
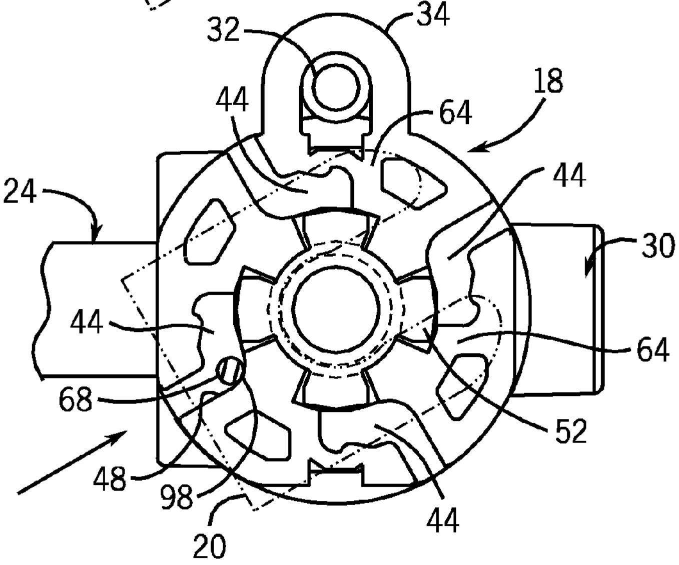
Figure 10:
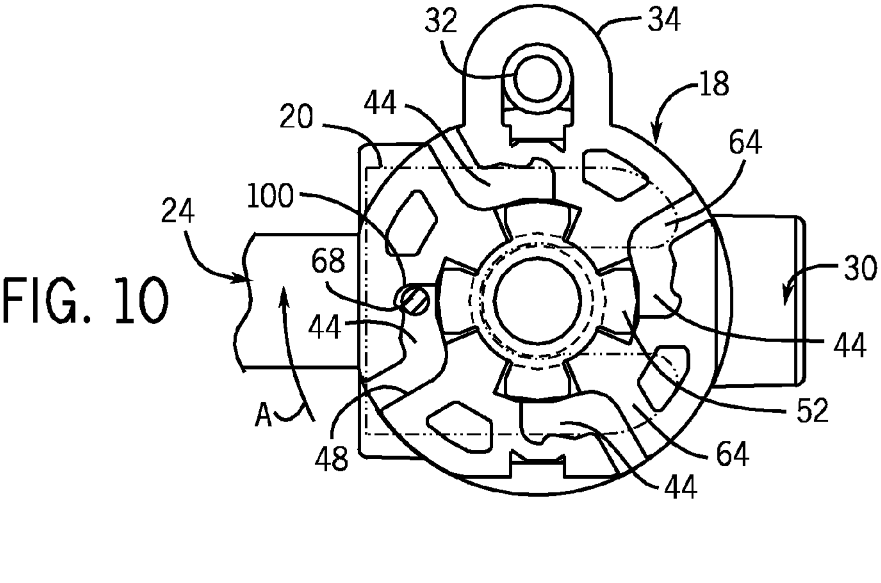

Once replacement solenoid 22 is again slidably mounted on the plunger 40, the frame 20 (shown in phantom lines) is reinstalled as depicted in FIGS. 8-10. Nib 68 is first aligned with the straight portion of the one cavity 44 with the bottom arms 64 sliding in frictional engagement between the snap plate 18 and the retaining elements 52, and the top arms 66 sliding against the base 88 of backstop 82. Bottom U-shaped slot 62 receives neck 50 on snap plate 18 and top U-shaped slot 62 receives body 90 on backstop 82. Frame 20 is then pushed forwardly so that nib 68 engages a cavity wall 48 at 98 (FIG. 9). Frame 20 is then rotated clockwise as shown by arrow A (FIG. 10) so that the nib 68 engages wall 48 at 100 which redefines a locking position. It should be understood that the frame 20 and the solenoid 22 can be positioned as desired in any of the three other cavities 44 depending on the orientation of the solenoid terminals 78 relative to the installation environment.

The valve 20 is thus more easily operated and serviced by making use of rotary and sliding motions of the frame 20 relative to the snap plate 18, and a frictional fit of the frame 20 relative to snap plate 18 and the backstop 82.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A solenoid valve having a valve body with an inlet, an outlet and a valve chamber therebetween, a valve member selectively engagable with the valve chamber for controlling flow of fluid from the inlet to the outlet, and a solenoid assembly mounted upon the valve member for moving the valve member to control the flow of fluid from the inlet to the outlet, the solenoid assembly including a solenoid and a frame for holding the solenoid, the valve member extending into the solenoid and movable therein in response to energization and deenergization of the solenoid, the frame having a bottom end plate, a top end plate and a connector plate joining the bottom end plate and the top end plate, the improvement comprising:

the solenoid assembly being connected to the valve body such that the frame is slidable by itself away from the valve body and the solenoid to permit full access to and slidable separate removal of the solenoid from the valve member, wherein the bottom end plate and the top end plate are formed with U-shaped slots defined by a pair of spaced apart bottom arms and a pair of spaced apart top arms, and wherein the frame and the solenoid have cooperating structure continuously preventing any rotation of the solenoid relative to the frame so that the frame is always rotatable together with the solenoid, the cooperating structure being defined by constant engagement of the top arms with a pair of spaced apart stop elements formed on a ledge on an upper end of the solenoid and projecting inwardly towards the top arms.

2. The improvement of claim 1, wherein the bottom end plate has a depending nib which is engagable with wall structure on the valve body.

3. The improvement of claim 1, wherein the solenoid assembly includes a backstop member engagable with the top arms of the frame.

4. The improvement of claim 3, wherein the backstop member is biased upwardly against the top arms of the frame by spring structure.

5. The improvement of claim 1, wherein the bottom arms of the frame are engagable about an upstanding portion of the valve body that encircles the valve member.

6. The improvement of claim 4, wherein the frame is slidable away from the solenoid by pressing downwardly on the backstop member against the force of the spring structure.

7. A solenoid operated, liquid dispensing valve comprising:

a valve body having an inlet and an outlet for respectively introducing liquid into and delivering liquid out of the valve body;

a valve member selectively movable relative to the valve body for controlling a flow of fluid from the inlet to the outlet; and a solenoid assembly mounted upon the valve body for selectively moving the valve member, the solenoid assembly including a solenoid slidably mounted on the valve member and a frame for holding the solenoid, the frame having a bottom end plate, a top end plate and a connector plate joining the bottom end plate and the top end plate, the bottom end plate and the top end plate being formed with U-shaped slots defined by a pair of spaced apart bottom arms and a pair of spaced apart top arms, wherein the valve body includes a snap plate for rotatably mounting the frame directly thereon, the snap plate having an upper surface formed with a series of spaced apart cavities having walls for variably positioning the frame relative to the snap plate, each of the cavities opening to a periphery of the snap plate for enabling removal of the frame therefrom, wherein the frame by itself is slidably separable from the solenoid and the valve body to permit slidable separate removal of the solenoid from the valve member, and wherein the frame and the solenoid have cooperating structure continuously preventing any rotation of the solenoid relative to the frame, the cooperating structure being defined by constant engagement of the top arms with a pair of spaced apart stop elements formed on a ledge on an upper end of the solenoid and projecting inwardly towards the top arms.

8. The valve of claim 7, wherein a cylindrical neck rises from the upper surface of the snap plate in the center thereof for receiving a portion of the valve member therethrough, the neck being formed with a number of outwardly projecting retaining elements.

9. The valve claim 7, wherein the bottom end plate has a dependent nib that is engagable with the wall of any of the cavities formed in the snap plate.

10. The valve of claim 8, wherein the pair of spaced apart bottom arms are frictionally engagable between the upper surface of the snap plate and the retaining elements on the neck.

11. The valve of claim 9, wherein the solenoid assembly includes an upwardly biased tubular backstop member that extends through a center of the solenoid and slidably receives an upper portion of the valve member, there being a coil spring between a top end of the backstop member and the upper portion of the valve member.

12. The valve of claim 11, wherein the top end of the backstop member is formed externally with a spool having a head, a base and a body connecting the head and the base.

13. The valve of claim 12, wherein the pair of spaced apart top arms are slidably engagable between the head and the base of the backstop member.

14. The valve of claim 13, wherein the top arms of the frame are slidable against the base of the backstop member.

15. The valve of claim 12, wherein the frame and the solenoid are rotatable together on the snap plate such that the nib on the frame will travel along the walls of one of the cavities in the snap plate to a predetermined position whereat downward pressure on the head of the backstop member will enable the frame by itself to be slidably pulled and removed from the snap plate.

16. A method of disassembling a solenoid valve to permit servicing thereof, the method comprising the steps of:

(a) providing a valve body having an inlet and outlet for respectively introducing liquid into and delivering liquid out of the valve body;

(b) providing a valve member selectively movable relative to the valve body for controlling flow of liquid from the inlet to the outlet;

(c) providing a solenoid assembly removably mounted on the valve body for selectively moving the valve member, the solenoid assembly including a solenoid slidably mounted on the valve member and a frame for holding the solenoid therein, the frame having a bottom end plate, a top end plate and a connector plate joining the bottom end plate and the top end plate, the bottom end plate and the top end plate being formed with U-shaped slots defined by a pair of spaced apart bottom arms and a pair of spaced apart top arms, wherein the frame and the solenoid have cooperating structure continuously preventing any rotation of the solenoid relative to the frame, the cooperating structure being defined by constant engagement of the top aims with a pair of spaced apart stop elements formed on a ledge on an upper end of the solenoid and projecting inwardly towards the top arms;

(d) rotating the frame and the solenoid together relative to the valve body to a predetermined position thereon;

(e) slidably pulling the frame by itself away from the valve body and the solenoid; and (f) slidably pulling the solenoid upwardly away from the valve member.

17. The method of claim 16, wherein steps (d), (e), and (f) are performed without the use of tools and fasteners.

* * * * *